United States Patent [19]

Easter

[11] Patent Number: 4,641,229
[45] Date of Patent: Feb. 3, 1987

[54] SWITCHING DC-TO-DC CONVERTERS

[75] Inventor: Finis C. Easter, Mount Laurel, N.J.

[73] Assignee: RCA Corporation, Princeton, N.J.

[21] Appl. No.: 414,481

[22] Filed: Sep. 2, 1982

Related U.S. Application Data

[63] Continuation of Ser. No. 245,103, Mar. 18, 1981.

[51] Int. Cl.[4] .......................................... H02M 3/335
[52] U.S. Cl. .......................................... 363/21; 363/45; 363/61
[58] Field of Search .................. 363/20, 21, 45, 60, 363/61; 323/222, 282

[56] References Cited

U.S. PATENT DOCUMENTS

| | | | |
|---|---|---|---|
| 3,740,639 | 6/1973 | Easter. | |
| 3,753,075 | 8/1973 | Tomura et al. | 363/131 |
| 3,935,526 | 1/1976 | Kamata et al. | 363/21 |
| 4,030,024 | 6/1977 | Chambers | 323/282 |
| 4,122,514 | 10/1978 | Amin | 363/21 |
| 4,186,436 | 1/1980 | Ishiwatari | 363/60 |
| 4,253,137 | 2/1981 | Rao | 363/21 |

FOREIGN PATENT DOCUMENTS

| | | | |
|---|---|---|---|
| 404069 | 3/1974 | U.S.S.R. | 363/21 |
| 750676 | 7/1980 | U.S.S.R. | 363/21 |

OTHER PUBLICATIONS

Electronic Engineering, vol. 51, No. 625, p. 18, (Jul. 1979).

Primary Examiner—William H. Beha, Jr.
Attorney, Agent, or Firm—Joseph S. Tripoli; Robert L. Troike; Allen LeRoy Limberg

[57] ABSTRACT

The input direct current used to build up the electromagnetic field surrounding the windings of a flyback transformer is converted by direct transformer action to current for replenishing charge in a first capacitor. Flyback current from the flyback transformer is used to replenish charge in a second capacitor. The sum of the voltages across the capacitors is supplied as converted energy to a load. In accordance with the invention, ripple in this output voltage is suppressed by proportioning the capacitances of the first and second capacitors to equal a nominal value of the ratio of the durations of the time intervals where direct transformer action obtains to the durations of the flyback intervals.

22 Claims, 10 Drawing Figures

SWITCHING DC-TO-DC CONVERTERS

This is a continuation of application Ser. No. 245,103 filed Mar. 18, 1981.

The present invention relates to dc-to-dc switching converters and to switching voltage regulators.

N.R.M. Rao in U.S. Pat. No. 4,253,137 issued Feb. 24, 1981 and entitled SWITCHED-MODE POWER SUPPLY describes a dc-to-dc switching regulator which combines directly transformed and flyback transformed converter output currents in such a way as to avoid the need for output filter chokes. During a first series of time intervals primary switch means are conductive to connect the primary winding of a flyback converter transformer across the primary direct current supply. The transformed primary current flowing as a secondary current from a secondary winding of the transformer during these intervals is integrated on a first capacitor to develop a first direct voltage component of the converter output voltage. The flyback current flowing from a secondary winding of the transformer during a second series of time intervals interleaved with the first, during which second series of time intervals the primary switch means is non-conductive, is integrated on a second capacitor.

The first and second direct component voltages are essentially ripple-free owing to the low-pass filtering afforded the capacitances of the first and second capacitors. The sum of the first and second direct component voltages is the converter output voltage, used as a voltage source for driving the converter load. This voltage or a portion of it is compared to a voltage standard to develop an error signal to control the relative durations of time intervals in the first and second series, thereby to complete a degenerative feedback loop that regulates the output voltage.

The present inventor has found that it is unnecessary in this general type of switching voltage regulator and its like to use first and second capacitors of high enough capacitance to filter the voltages across them to be essentially direct in nature. If the capacitances of the first and second capacitors are sufficiently large that their charging and discharging are approximately linear, the ripple voltages superposed on their direct components will be anti-phase. The relative sizes of the capacitances are then proportioned so that the ripple voltages compensate against each other in the converter output. This is done by proportioning their capacitances in ratio according to the energy they respectively supply to the converter load under nominal duty cycle conditions. An appreciable reduction in the capacitances of the first and second capacitors required for a given degree of voltage ripple suppression over a given regulation range can be achieved by this way, with an attendant reduction in the cost of three capacitors.

In the drawing.

Each of FIGS. 1, 2 and 3 is a schematic diagram of a switching dc-to-dc converter embodying the invention.

Figure 1:
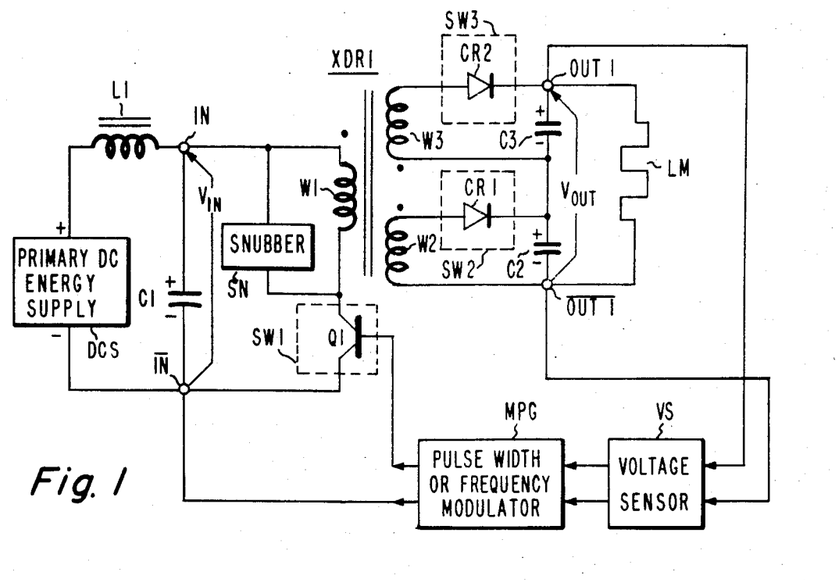
Figure 2:
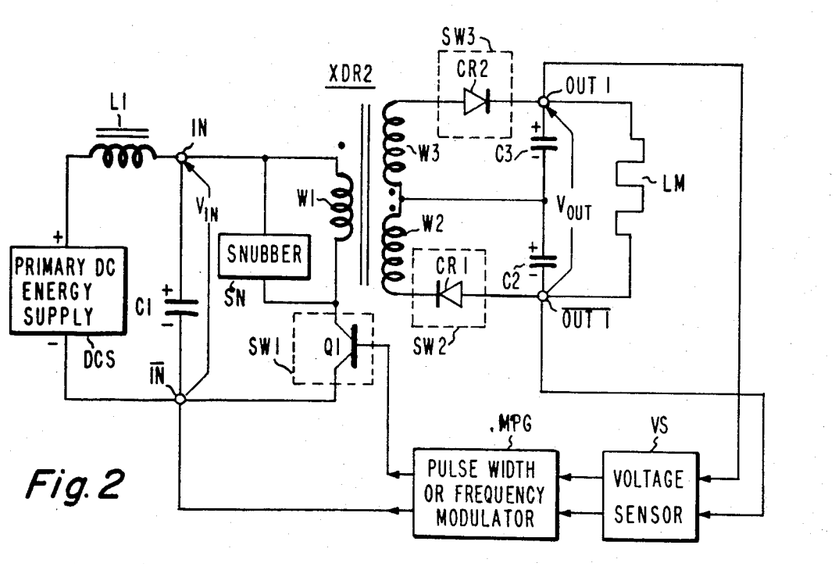
Figure 3:
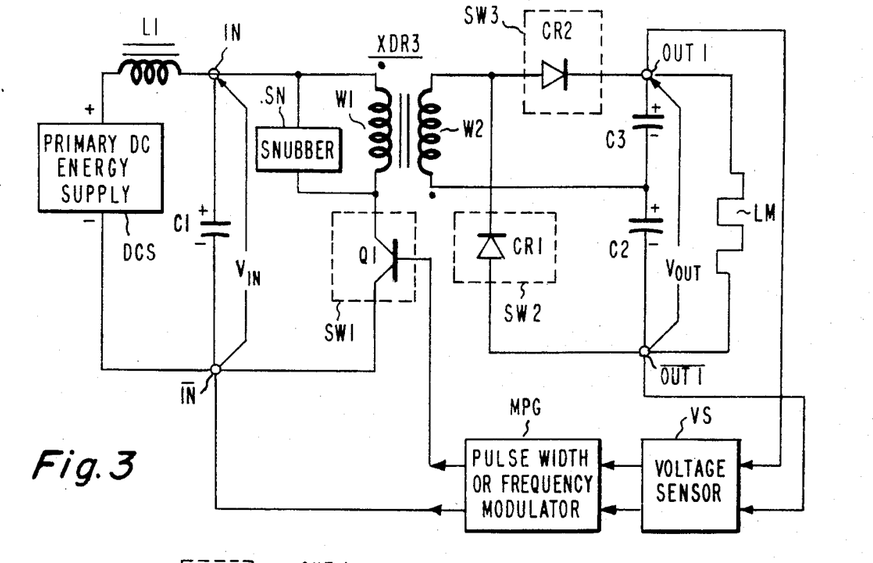

In each of the FIGS. 1, 2 and 3, a primary d-c energy supply DCS supplies an input voltage $V_{IN}$ between first and second input terminals IN and $\overline{\text{IN}}$. A switch means SW1 is periodically conductive to selectively connect the primary winding W1 of a flyback transformer XDR1, XDR2 or XDR3 between terminals IN and $\overline{\text{IN}}$, at which time current flows in this primary winding to build up an electromagnetic field surrounding it and at least one associated secondary winding. Energy is stored in this electromagnetic field. To smooth out the input current demanded from supply DCS, it is customary to insert an inductor L1 in series connection with supply DCS between terminals IN and $\overline{\text{IN}}$, and to parallel this series connection with a capacitor C1. C1 supplies transient current demand when switch means SW1 is switched into conduction and thereby maintains a direct potential reasonably free of ripple between terminals IN and IN.

Switch means SW1 is shown as a bipolar transistor and may be either of NPN type with collector connected to the undotted end of winding W1 and emitter connected to terminal $\overline{\text{IN}}$, or of PNP type with emitter connected to the undotted end of winding W1 and collector connected to terminal $\overline{\text{IN}}$. The order of winding W1 and the collector-emitter path Q1 in their series connection between terminals IN and IN may be reversed, of course, with appropriate accomodations to the coupling of switching signals to the base-emitter path of Q1. Switch means SW1 may alternatively comprise a field effect transistor or a semiconductor controlled rectifier, as well.

During the times switch means SW1 is conductive to connect the primary winding W1 of transformer XDR1, XDR2 or XDR3 between terminals IN and $\overline{\text{IN}}$—i.e., across capacitor C1—the current flowing in winding W1 builds up the electromagnetic field surrounding the transductor windings, thus storing energy. This change in field strength induces a voltage in a secondary winding W2 of the transformer, and a switch means SW2 simultaneously conductive with switch means SW1 connects W2 to charge a storage capacitor C2 with transformed current flow through winding W2. During the times switch means SW1 is non-conductive, the electromagnetic field surrounding the transformer windings collapses as it supplies the energy to induce a flyback voltage in a secondary winding of the transformer (i.e., a further secondary winding W3 of the transformers XDR1 and XDR2 of FIGS. 1 and 2, respectively, and winding W2 of the transformer XDR3 of FIG. 3). This flyback voltage supports the flow of current to charge capacitor C3. As is customary, the flyback voltage across winding W1 owing to its self-inductance is snubbed by a snubber circuit SN, typically comprising a capacitor and resistance in series connection, to avoid damaging of the converter input circuitry.

A switch means SW3 is conductive when switch means SW1 is non-conductive to charge a storage capacitor C3 with the flyback current from the transducer secondary winding. At their simplest, switch means SW2 and SW3 consist of current rectifier devices CR1 and CR2, respectively, but may be provided by other means—such as switching transistors to avoid the forward potential drop associated with current rectifier devices, for example. The capacitors C2 and C3 are in series connection between the converter output terminals OUT1 and $\overline{\text{OUT1}}$, and the sum of the voltages across them is the output voltage $V_{OUT}$ applied to the load means LM1 connected between terminals OUT1 and $\overline{\text{OUT1}}$.

The output voltage $V_{OUT}$ of the converter is regulated by degenerative feedback arrangement wherein $V_{OUT}$ of the converter is sensed in a voltage sensor VS to develop a signal that modulates the duration or repetition rate of pulses generated by a modulated pulse generator MPG and used to control the conduction of switch means SW1. Voltage sensor VS typically comprises a resistive potential divider and an analog voltage comparator for comparing the divided-down $V_{OUT}$ with a reference voltage to develop the error voltage applied as modulating signal to pulse generator MPG. If Q1 is a NPN transistor with emitter connected to terminal IN, for example, positive-going pulses applied to the base of Q1 would condition it for conduction. Switch means SW1 is switched into conduction for longer times to reduce decrease of $V_{OUT}$ below a prescribed value, and is switched into conduction for shorter times to reduce increase of $V_{OUT}$ above the prescribed value. This mode of switching voltage regulation is similar to that of standard practice in that the feedback control of the conduction of Q1 has effect on the energy supplied from winding W3, on the voltage developed across C3 according to Coulomb's Law responsive to the flyback current charging C3, and thus on the voltage $V_{OUT}$ of which the voltage across C3 is a component. This mode of switching regulation departs from standard practice in that $V_{OUT}$ has an additional component, the voltage across C2, which is substantially non-responsive to the variation in conduction of Q1. When Q1 is conductive, substantially full $V_{IN}$ is applied to winding W1 to cause a voltage across W2 which is (in accordance with normal transformer action) related to $V_{IN}$ in the ratio of the number of turns on winding W2 to the number of turns on winding W1.

The induction of voltage in winding W2 and transformation of current as between windings W1 and W2 during build up of the electromagnetic field surrounding the transformer windings is normal transformer action, which does not involve storage of energy in the magnetic structure (e.g., core) associated with the windings. So, the energy converted by normal transformer action is converted without requiring any additional magnetic structure beyond that used to store the energy to be converted by flyback transformer action. To minimize the size of the core required by the transformer it ideally is preferable, then, to convert as large as possible a portion of the energy to be converted by normal transformer action, and to convert by flyback transformer action only so much of the energy to be converted as is needed to implement regulation of the converter output voltage $V_{OUT}$ against variation in the loading imposed by a load means LM1 and against variation in the converter input voltage $V_{IN}$. Practically speaking, one must consider such factors as keeping the reverse voltage imposed on the switching device (e.g., Q1) in switch means SW1 during flyback sufficiently low so as not to damage the device. Since the average voltage across winding W1 must be zero, assuming winding resistance to be negligible, and since the voltage across winding W1 equals $V_{IN}$ during conduction of switch means SW1, then when SW1 is non-conductive the flyback voltage across winding W1 must equal $V_{IN}$ multiplied by the ratio of the duration of the SW1 conduction interval to its non-conduction interval. This flyback voltage, as transformed according to the ratio of the number of turns in winding W3 to those in winding W1, determines the voltage induced across winding W3 during flyback—i.e., when switch means SW1 is non-conductive. $V_{IN}$, transformed according to the ratio of the number of turns in winding W3 to those in winding W1, determines the voltage induced across winding W2 when switch means SW1 is conductive, of course. Since the load current through load means LM flows through series connection of the flyback conversion and direct transformer conversion output circuits, the fraction of the converted energy contributed by each of these output circuits is equal to the fraction its component output voltage is of the entire output voltage $V_{OUT}$ across the series connection of these output circuits.

The ripple voltages developed across energy storage capacitors C2 and C3 are opposing-phase in their summation to provide $V_{OUT}$. Their respective capacitances $C_2$ and $C_3$ are chosen, in accordance with the present invention, to minimize the ripple voltage at the nominal duty cycle for conduction by switch means SW1.

In order to minimize ripple $C_3$ and $C_2$ are chosen in ratio according to the percentage time they are called upon to supply energy to load means LM—i.e., the ratio of the time interval when switch means SW3 is non-conductive and switch means SW2 is conductive to the time interval when switch means SW3 is conductive and switch means SW2 is non-conductive. Since this is the ratio of the time interval when switch means SW1 is conductive to the time interval when it is non-conductive, $C_3/(C_2+C_3)$ equals the duty cycle for minimum ripple. So for minimum ripples $$C_2 = C_3[(1/f) - 1]$$

where $\eta$ is the nominal duty factor.

In FIG. 1 transformer XDR1 has its primary winding W1 mutually coupled to two separate secondary windings W2 and W3. Switch means SW2, conductive to charge C2 with transformed primary winding current, is provided by a suitably-poled current rectifier CR1; and switch means SW3, conductive to charge C3 with flyback current, is provided by a suitably poled current rectifier CR2. In FIG. 2 relocation of switch means SW2 permits the use of a transformer XDR2 with secondary windings W2 and W3 from which only three leads need be brought out. This arrangement suggests how a transformer XDR3 with a single secondary winding W2 can be used both to charge C2 with flyback current and to charge C3 with directly transformed current as shown in FIG. 3.

Figures 4, 5:
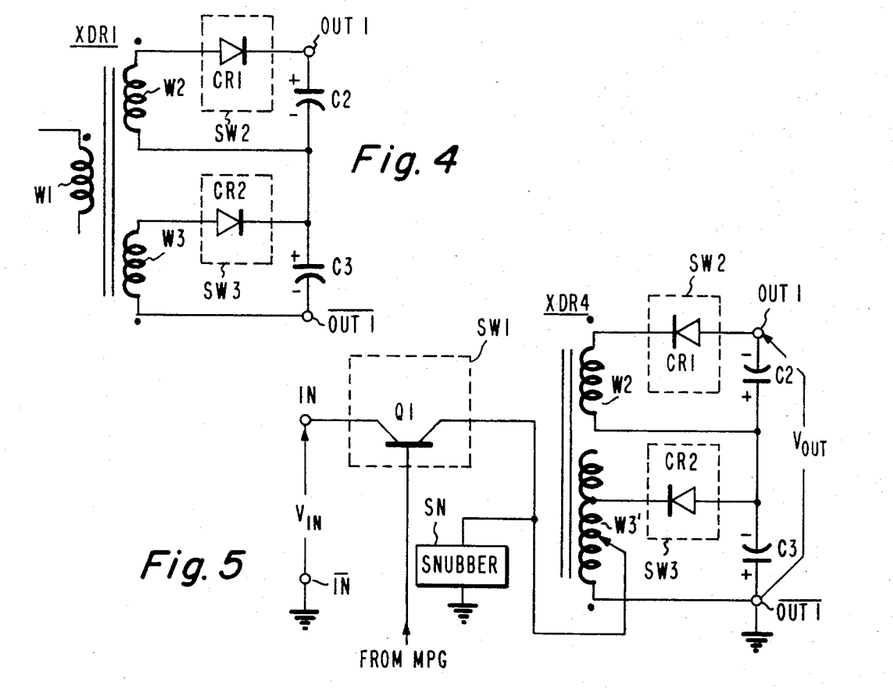
FIG. 4 is a schematic diagram of a modification to the FIG. 1 switching converter resulting in another switching converter embodying the invention.
FIG. 5 is a schematic diagram of a modification of the FIG. 1 switching converter, resulting in another switching converter embodying the invention.
Figures 6, 8:
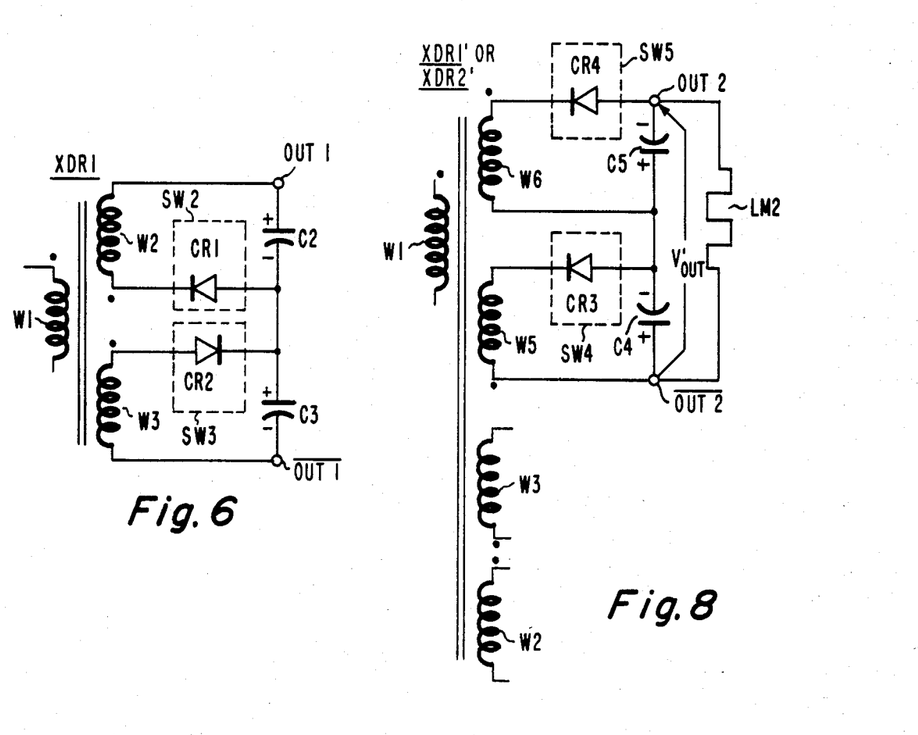
FIG. 6 is a schematic diagram of a modification that can be made to the FIG. 2 switching converter resulting in another switching converter embodying the invention.
FIG. 8 is a schematic diagram showing a modification to the FIGS. 1 or 2 switching converter to provide in accordance with the invention a switching converter with a plurality of output voltages.
Figure 7:
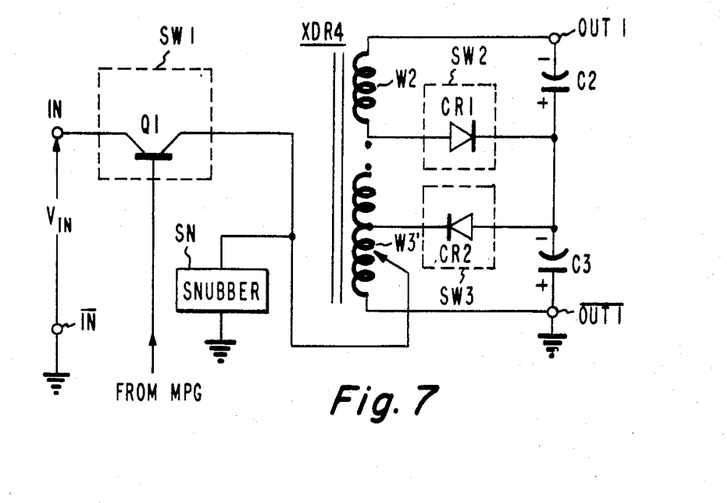
FIG. 7 is a schematic diagram of a modification that can be made to the FIG. 2 switching converter, resulting in another switching converter embodying the invention.

FIG. 4 illustrates that the FIG. 1 switching dc-to-dc converter can be modified by reversing the order of connection of capacitors C2 and C3 between terminals OUT1 and $\overline{OUT1}$. FIG. 5 shows a modification of the FIG. 1 converter that can be made where $V_{IN}$ and $V_{OUT}$ are opposite polarity voltages (plus and minus, respectively, as shown) referred to a common potential (ground, as shown) which uses a two-winding transformer XDR4. The adjustable tap connection on its winding W3' need not indicate a connection that is variable after construction of the transformer XDR4, but may rather indicate a connection that may be selected prior to construction to suit the up or down conversion of input voltage $V_{IN}$ to develop output voltage $V_{OUT}$. FIGS. 6 and 7 show modifications to the FIG. 2 converter analogous to the modifications of the FIG. 1 converter shown in FIGS. 4 and 5.

Figure 9:
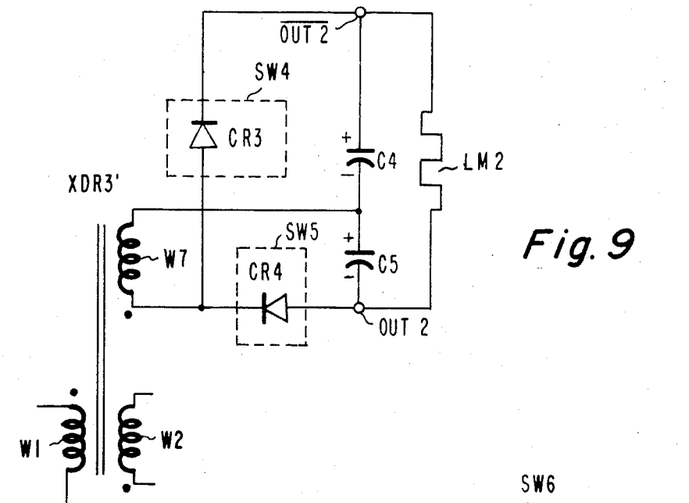
FIG. 9 is a schematic diagram of a modification to the FIG. 3 switching converter for providing in accordance with the invention a plurality of output voltages.

FIG. 8 shows how modifications XDR1' and XDR2' of transformers XDR1 and XDR2, respectively, to include a further pair of windings W5 and W6 having the same turns ratio to each other as windings W2 and W3, have to each other can be used to generate a further, indirectly regulated output voltage $V'_{OUT}$ for application to a second load means LM2 connected between output terminals OUT2 and $\overline{OUT2}$. The ratio of the capacitances of C4 and C5 to each other is chosen the same way as the ratio of the capacitances of C2 and C3 to each other. The ratio of the amplitudes of $V_{OUT}'$ and $V_{OUT}$ to that of $V_{IN}$ are determined the same way. By way of example, $V'_{OUT}$ is shown to be opposite in polarity to $V_{OUT}$. Switch means SW4, shown consisting of current rectifier CR3, conducts simultaneously with switch means SW1 to apply directly transformed primary winding W1 current to C4 to charge it. Switch means SW5, shown consisting of current rectifier CR4, conducts when switch means SW1 is non-conductive to apply flyback current to C5 to charge it. FIG. 9 shows how a modification XDR3' of transformer XDR3 to include a further winding W7 can be used to generate $V'_{OUT}$ for application to load means LM2.

Figure 10:
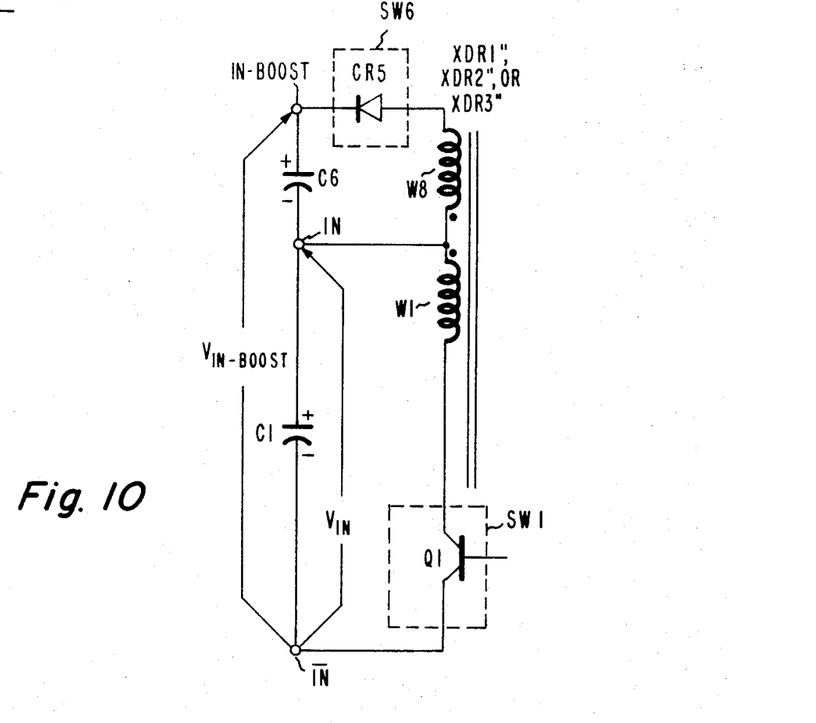
FIG. 10 is a schematic diagram of a modification that can be made to the switching converters of FIGS. 1, 2 or 3 to provide a boosted input voltage which is indirectly regulated responsive to the regulation of the output voltage of that switching converter.

FIG. 10 shows how modifications XDR1" and XDR2" of transformers XDR1 and XDR2 to include a winding W8 in turns ratio with winding W1 the same as the turns ratio between windings W3 and W2—or a modification XDR3" of transformer XDR3 to include a winding W8 in 1:1 turns ratio with winding W1—can be used in generating an indirectly regulated boosted input voltage $V_{IN-BOOST}$. Switch means SW6, shown as consisting of current rectifier CR5, is conductive to charge C6 with flyback current when switch means SW1 is non-conductive. Boosted input voltage may be taken from the input winding of a modification of transformer XDR4 in modifications of the FIGS. 5 and 7 switching dc-to-dc converters, as well.

One skilled in the art of switching converter design and armed with the above disclosure will be empowered to have other embodiments of the invention come to mind, and the following claims should be construed accordingly. E.g., while switch means SW2, SW3, SW4, SW5 and SW6 most simply are provided by current rectifiers, they may also be provided by the principal current conduction paths of appropriately switched transistors, as may be done to reduce the potential offsets across the switch means.

What is claimed is:

1. A switching dc-to-dc converter comprising:
   first and second input terminals for connecting a primary dc energy supply between;
   first and second output terminals for connecting a load between;
   transformer means having at least first and second windings, its windings being continuously transformer-coupled to each other;
   first switch means for connecting the first winding of said transformer means in a path for input current flow between said first and second input terminals during a first series of time intervals and for disconnecting the first winding from said path during a second series of time intervals interleaved in time with said first series of time intervals;
   first and second capacitors having first and second capacitances respectively between their first and second plates, the first plate of said first capacitor being connected to said first output terminal, the first plate of said second capacitor being connected to said second ouput terminal, and the second plates of said first and second capacitors being interconnected at a first node, the ratio of said first capacitance to said second capacitance being equal to a nominal value of the ratio of the durations of time intervals in said first series to the durations of time intervals in said second series, for reducing output voltage ripple between said first and second output terminals;
   means applying transformed input current from said second winding of said transformer means to said first capacitor for charging said first capacitor during each of said first series of time intervals; and
   means applying flyback current from one of the windings of said transformer means to said second capacitor for charging said second capacitor during each of said second series of time intervals.

2. A switching dc-to-dc converter as set forth in claim 1 wherein said transformer means includes as the said one of its windings from which flyback current is applied to said second capacitor a third winding, said second and third windings having respective first and second ends between which currents of opposite polarities tend to be induced responsive to changes in the strength of the electromagnetic field surrounding them.

3. A switching dc-to-dc converter as set forth in claim 2 wherein said means for charging said first capacitor includes
   a connection of the first end of said second winding to said first output terminal, and
   second switch means non-conductive during said second series of time intervals and conductive during said first series of time intervals to connect the second end of said second winding to said first node; and wherein said means for charging said second capacitor includes
   a connection of the first end of said third winding to said first node and
   third switch means non-conductive during said first series of time intervals and conductive during said second series of time intervals to connect the second end of said third winding to said second output terminal.

4. A switching dc-to-dc converter as set forth in claim 2 wherein said means for charging said first capacitor includes
   second switch means non-conductive during said second series of time intervals and conductive during said first series of time intervals to connect the first end of said second winding to the first output terminal, and a connection of the second end of said second winding to said first node; and wherein said means for charging said second capacitor includes a connection of the first end of said third winding to said first node, and third switch means non-conductive during said first series of time intervals and conductive during said second series of time intervals to connect the second end of said third winding to said second output terminal.

5. A switching dc-to-dc converter as set forth in claim 2 wherein said means for charging said first capacitor includes second switch means non-conductive during said second series of time intervals and conductive during said first series of time intervals to connect the first end of said second winding to said first output terminal, a connection of the second end of said second winding to said first node; and wherein said means for charging said second capacitor includes a connection of the first end of said third winding to said first node, and third switch means non-conductive during said first series of time intervals and conductive during said second series of time intervals to connect the second end of said third winding to said second output terminal.

6. A switching dc-to-dc converter as set forth in claim 2 wherein said means for charging said first capacitor includes second switch means non-conductive during said second series of time intervals and conductive during said first series of time intervals to connect the first end of said second winding to said second output terminal, and a connection of the second end of said second winding to said second output terminal; and wherein said means for charging said second capacitor includes a connection of the first end of said third winding to said first output terminal, and third switch means non-conductive during said first series of time intervals and conductive during said second series of time intervals to connect the second end of said third winding to said first node.

7. A switching dc-to-dc converter as set forth in claim 3, 4, 5 or 6 having in combination therewith to form a switching regulator:

means responsive to the departure of the voltage between said first and second output terminals from prescribed value for changing the ratio of the relative durations of the time intervals in said first series and in said second series from its said nominal value.

8. A switching regulator as set forth in claim 7 wherein said transformer means includes fourth and fifth windings in the same turns ratio to each other as said second and third windings are to each other; wherein third and fourth output terminals are provided for connection of a further load therebetween; wherein third and fourth capacitors are connected at ones of their respective plates, the others of which connect the respective ones of said third and fourth terminals; wherein fourth switch means is conductive during time intervals in said first series to complete connection of said fourth winding across said third capacitor for furnishing it with charge; and wherein fifth switch means is conductive during time intervals in said second series to complete connection of said fifth winding across said fourth capacitor for furnishing it with charge.

9. A switching regulator as set forth in claim 7 wherein said transformer means includes a fourth winding having a first end connected to one of said first and second input terminals and having a second end; wherein a third capacitor has a first plate connected to one of said first and second input terminals and has a second plate; and wherein a fourth switch means is conductive during each of said second series of time intervals to connect the second end of said fourth winding to the second plate of said third capacitor for developing an indirectly regulated boosted input voltage thereat.

10. A switching dc-to-dc converter as set forth in claim 1 wherein said first input and first output terminals are in common connection at a first point in said first winding; wherein said first switch means conducts to selectively connect a second point in said first winding to said second input terminal; wherein said means for charging said first capacitor includes a connection of the first end of said second winding to said first node, and second switch means non-conductive during said second series of time intervals and conductive during said first series of time intervals to connect the second end of said second winding to the first output terminal; and wherein said means for charging said second capacitor includes, in addition to the connection of the first end of said first winding to said first output terminal, third switch means non-conductive during said first series of time intervals and conductive during said second series of time intervals to connect a third point of said first winding different from said first point of said first winding to said first node.

11. A switching dc-to-dc converter as set forth in claim 1 wherein said first input and first output terminals are in common connection at a first point in said first winding; wherein said first switch means conducts to selectively connect a second point in said first winding to said second input terminal; wherein said means for charging said first capacitor includes second switch means non-conductive during said second series of time intervals and conductive during said first series of time intervals to connect the first end of said second winding to said first node, and a connection of the second end of said second winding to said second output terminal; and wherein said means for charging said second capacitor includes, in addition to the connection of the first end of said first winding to said first output terminal, third switch means non-conductive during said first series of time intervals and conductive during said second series of time intervals to connect a third point of said first winding different from said first point of said first winding to said first node.

12. A switching dc-to-dc converter as set forth in claim 10 or 11 having in combination therewith to form a switching regulator:

means responsive to the departure of the voltage between said first and second output terminals from prescribed value for changing the ratio of the relative durations of the time intervals in said first series and in said second series from its said nominal value.

13. A switching regulator as set forth in claim 12 wherein said transformer means includes a third winding; wherein third and fourth output terminals are provided for connection of a further load therebetween; wherein third and fourth capacitors are connected at ones of their respective plates the others of which connect to respective ones of said third and fourth terminals; wherein fourth switch means is conductive during time intervals in said first series to complete connection of said third winding across said third capacitor for furnishing it with charge; and wherein fifth switch means is conductive during time intervals in said second series to complete connection of said third winding across said fourth capacitor for furnishing it with charge.

14. A switching regulator as set forth in claim 12 wherein said transformer means includes a third winding having a first end connected to one of said first and second input terminals and having a second end; wherein a third capacitor has a first plate connected to one of said first and second input terminals and has a second plate; and wherein a fourth switch means is conductive during each of said second series of time intervals to connect the second end of said third winding to the second plate of said third capacitor for developing an indirectly regulated boosted input voltage thereat.

15. A switching dc-to-dc converter as set forth in claim 3, 4, 5, 6, 10 or 11, wherein said second switch means includes a first current rectifier poled for conduction during each time interval in said first series of time intervals.

16. A switching dc-to-dc converter as set forth in claim 15 wherein said third switch means includes a second current rectifier poled for conduction during each time interval in said second series of time intervals.

17. A switching dc-to-dc converter as set forth in claim 3, 4, 5, 6, 10, or 11, wherein said third switch means includes a current rectifier poled for conduction during each time interval in said second series of time intervals.

18. A switching dc-to-dc converter comprising
first and second input terminals for connecting a primary dc energy supply between;
first and second output terminals for connecting a load between;
first and second capacitors connected at ones of their respective plates, other respective plates of which connect to separate ones of said first and second output terminals;
flyback transformer means having a first winding, having second and third windings with respective first and second ends between which currents of opposite polarities tend to be induced responsive to changes in the strength of the electromagnetic field surrounding the windings, and having fourth and fifth windings with respective first and second ends between which currents of opposite polarities tend to be induced responsive to changes in the strength of the electromagnetic field surrounding the windings, said fourth and fifth windings being in the same turns ratio as said second and third windings;
first switch means for connecting the first winding of said flyback transformer means in a path for input current flow between said first and second input terminals during a first series of time intervals and for disconnecting the first winding from said path during a second series of time intervals interleaved in time with said first series of time intervals;
second switch means non-conductive during said second series of time intervals, but conductive during said first series of time intervals to complete a connection of said second winding across said first capacitor for furnishing it charge;
third switch means non-conductive during said first series of time intervals, but conductive during said second series of time intervals to complete a connection of said third winding across said second capacitor for furnishing it charge;
means responsive to the departure of the voltage between said first and second output terminals from prescribed value for changing the relative durations of the time intervals in said first series and in said second series so as to regulate the voltage between said first and second output terminals;
third and fourth output terminals for connecting a further load between for receiving an indirectly regulated voltage;
third and fourth capacitors connected at ones of their respective plates, the others of which connect to separate ones of said third and fourth terminals, the capacitance of said third capacitor being in a ratio with the capacitance of said fourth capacitor, which ratio is equal to a nominal value of the ratio of the durations of time intervals in said first series with the durations of time intervals in said second series, for suppressing ripple in said indirectly regulated voltage;
fourth switch means conductive during time intervals in said first series to complete a connection of said fourth winding across said third capacitor for furnishing it charge; and
fifth switch means conductive during time intervals in said second series to complete a connection of said fifth winding across said fourth capacitor for furnishing it charge.

19. A switching dc-to-dc converter comprising:
first and second input terminals for connecting a primary dc energy supply between;
first and second output terminals for connecting a load between;
third and fourth output terminals for connecting a further load between to receive an indirectly regulated voltage;
first and second capacitors connected at ones of their respective plates, other respective plates of which connect to separate ones of said first and second output terminals;
flyback transformer means having first, second and third windings with respective first and second end connections;
first switch means for connecting the first winding of said flyback transformer means in a path for input current flow between said first and second input terminals during a first series of time intervals and for disconnecting the first winding from said path during a second series of time intervals interleaved in time with said first series of time intervals;
second switch means non-conductive during said second series of time intervals, but conductive during said first series of time intervals to complete a connection of at least a portion of said second winding across said first capacitor for furnishing it charge;

third switch means non-conductive during said first series of time intervals, but conductive during said second series of time intervals to complete a connection of at least a portion of said second winding across said second capacitor for furnishing it charge;

means responsive to the departure of the voltage between said first and second output terminals from prescribed value for changing the relative durations of the time intervals in said first series and in said second series so as to regulate the voltage between said first and second output terminals;

third and fourth capacitors connected at ones of their respective plates, other respective plates of which connect to separate ones of said third and fourth output terminals, the capacitance of said third capacitor being in a ratio with the capacitance of said fourth capacitor, which ratio is equal to a nominal value of the ratio of durations of time intervals in said first series with the durations of time intervals in said second series, for suppressing ripple in said indirectly regulated voltage;

fourth switch means conductive during time intervals in said first series to complete a connection of at least a portion of said third winding across said third capacitor for furnishing it charge; and fifth switch means conductive during time intervals in said second series to complete a connection of at least a portion of said third winding across said fourth capacitor for furnishing it charge, which portion is chosen for developing said indirectly regulated voltage between said third and fourth output terminals in proportion to the directly regulated voltage between said first and second output terminals.

20. A switching dc-to-dc converter comprising:

first and second input terminals for connecting a primary dc energy supply between;

first and second output terminals for connecting a load between;

third and fourth output terminals for connecting a further load between;

first and second capacitors connected at ones of their plates, other respective plates of which connect to separate ones of said first and second output terminals;

flyback transformer means having at least first, second and third windings;

first switch means for connecting at least a portion of the first winding of said flyback transformer means in a path for input current flow between said first and second input terminals during a first series of time intervals and for disconnecting the first winding from said path during a second series of time intervals interleaved in time with said first series of time intervals;

second switch means non-conductive during said second series of time intervals, but conductive during said first series of time intervals to complete a connection of at least a portion of said second winding across said first capacitor for furnishing it charge;

third switch means non-conductive during said first series of time intervals, but conductive during said second series of time intervals to complete a connection of at least a portion of a winding of said flyback transformer means across said second capacitor for furnishing it charge;

means responsive to the departure of the voltage between said first and second output terminals from prescribed value for changing the relative durations of the time intervals in said first series and in said second series so as to regulate the voltage between said first and second output terminals;

third and fourth capacitors connected at ones of their respective plates, other respective plates of which connect to separate ones of said third and fourth output terminals, the capacitance of said third capacitor being in a ratio with the capacitance of said fourth capacitor, which ratio is equal to a nominal value of the ratio of time durations in said first series with the durations of time intervals in said second series, for suppressing ripple in said indirectly regulated voltage;

fourth switch means conductive during time intervals in said first series to complete a connection of at least a portion of said third winding across said third capacitor for furnishing it charge; and fifth switch means conductive during time intervals in said second series to complete a connection of at least a portion of a winding of said flyback transformer across said fourth capacitor for furnishing it charge.

21. A switching dc-to-dc converter comprising:

a flyback transformer having a primary winding and at least first and second secondary windings means for selectively connecting the primary winding of said flyback transformer to a primary energy source during a first series of time intervals and disconnecting it during a second series of time intervals interleaved in time with said first series of time intervals;

means for developing a first converter output level responsive to directly transformed current flowing in a first of the secondary windings of said flyback transformer during said first series of time intervals and to a first flyback current flowing in one of the secondary windings, not necessarily the first, during said second series of time intervals;

means controlling the ratio of the durations of time intervals in said second series to the durations of time intervals in said first series responsive to some portion of said first converter output level departing from a prescribed value, for regulating said first converter output level;

a first capacitor having a first capacitance associated threwith;

means connecting said first capacitor to charge said first capacitance with directly transformed current flowing in said second secondary winding during said first series of time intervals;

a second capacitor having a second capacitance associated therewith, the ratio of said second capacitance to said first capacitance being equal to a nominal value of the ratio of the durations of said second series of time intervals to the durations of said first series of time intervals;

means connecting said second capacitor to charge said second capacitance with a second flyback current flowing in one of the secondary windings of said converter transformer; and a series connection of said first and second capacitors across which a substantially direct voltage free of ripple is provided as a second converter output level.

22. In combination:

means for supplying first rectified voltage signal of a first amplitude during a first series of regularly spaced equal-length time intervals;

means for supplying second rectified voltage of a second amplitude during a second series of regularly spaced equal-length time intervals interleaved in time with said first series of time intervals, the lengths of time intervals in said second series differing from the lengths of time intervals in said first series; and means for summing said first and second rectified voltage signals to form a constant output voltage with reduced ripple, which means includes first and second output terminals between which said output voltage is to appear, a nodal connection between which and said first output terminal said first rectified voltage signal is applied and between which and said second output terminal said second rectified voltage signal is applied in the sense for summing with said first rectified voltage signal, means providing a first capacitance between said first output terminal and said nodal connection, and means providing a second capacitance between said second output terminal and said nodal connection, which second capacitance is related to said first capacitance in the same ratio as the length of a time interval in said first series of time intervals to the length of a time interval in said second series of time intervals.

* * * * *